United States Patent
Huang

[19]

[11] Patent Number: 6,158,092
[45] Date of Patent: Dec. 12, 2000

[54] BUCKLE DEVICE

[76] Inventor: Han-Ching Huang, P.O. Box 63-247, Taichung, Taiwan

[21] Appl. No.: 09/316,746

[22] Filed: May 21, 1999

[51] Int. Cl.[7] ..................................................... B25B 25/00
[52] U.S. Cl. ........................................................ 24/68 CD
[58] Field of Search ............................. 24/170, 191–193, 24/71 TD, 71 ST, 68 E, 68 A, 68 D, 68 CD, 68 R

[56] References Cited

U.S. PATENT DOCUMENTS

| 5,282,296 | 1/1994 | Huang | 24/68 CD |
| 5,655,623 | 8/1997 | Skyba | 182/116 |

Primary Examiner—James R. Brittain
Attorney, Agent, or Firm—Alan Kamrath

[57] ABSTRACT

A buckle device includes a main body, a rotational retaining member rotatably mounted to the main body, and a buckle having an end connected to the rotational retaining member to pivot therewith. The other end of the buckle further includes an engaging plate for releasably engaging with an engaging member of the main body. The rotational retaining member includes two shaft halves having a slit therebetween through which a free end of a strap extends. The free end of the strap wraps around the shaft halves and extends through the slit between the shaft halves when the engaging plate on the buckle engages with the engaging member of the main body.

9 Claims, 6 Drawing Sheets

BUCKLE DEVICE

BACKGROUND OF THE INVENTION

1. Field of the Invention

The present invention relates to a buckle device for cargo trucks or the like.

2. Description of the Related Art

FIG. 6 of the drawings illustrates a conventional buckle device for cargo trucks. The buckle device includes a main body 60 and a buckle 70 having an end pivoted to a mediate portion of the main body 60 by a pivotal shaft 64. The pivoted end of the buckle 70 includes an eccentric portion 73 with teeth 72 formed thereon. A torsion spring 71 is mounted between the buckle 70 and the pivotal shaft 64 for biasing the teeth 72 toward a fixed seat 62. A first end of the main body 60 includes a fixed pin 63 to which an end 92 of a strap 90 is attached. The other end 93 of the strap 90 includes a hook member 91 attached thereto so as to be hooked to, e.g., a cargo truck frame (not shown). Another strap 80 is provided and includes a first end 83 to which a hook member 81 is attached so as to be hooked to the cargo truck frame. A second free end 82 of the strap 80 is extended through a slot 61 in the main body 60 and then bent about 180° to extend through a gap between the teeth 72 and the fixed seat 62, as shown in FIG. 6. In the adjustment of the length of the strap 80 intended for tightly retaining goods on the cargo truck, the worker must pivot the other end of the buckle 70 with one hand to form the gap between the teeth 72 and the fixed seat 62 to thereby allow he or she to pull the free end 82 of the strap 80 with the other hand until he or she feels that the goods would be reliably retained. Nevertheless, the force applied by the torsion spring for biasing the teeth 72 to achieve the required retaining function is insufficient and thus risky. The strap 80, usually made of nylon, tends to be damaged by the teeth 72 and thus incapable of providing the required retaining function. Frequent change of the strap 80 is required. In addition, adjustment of the strap length is inconvenient since both hands are required.

The present invention is intended to provide a buckle device that mitigates and/or obviates the above problems.

SUMMARY OF THE INVENTION

It is a primary object of the present invention to provide an improved buckle device that has a double safety arrangement to provide a reliable retaining effect for the strap.

In accordance with a first aspect of the invention, a buckle device comprises:

a main body having an engaging member;

a rotational first retaining means rotatably mounted to the main body and including a slit through which a free end of a strap is extended; and a buckle having a first end connected to the rotational first retaining means to pivot therewith and a second operative end, the second operative end of the buckle further including a second retaining means thereon for releasably engaging with the engaging member of the main body.

In an embodiment of the invention, the engaging member of the main body is an engaging notch in which a wall defining the engaging notch has a hook thereon. The retaining member on the buckle includes a retaining member with an engaging plate releasably engaged with the engaging notch and an elastic member for biasing the engaging plate to engage with the engaging notch.

In accordance with a second aspect of the invention a buckle device comprises:

a main body including two side walls, each said side wall including a first end, a second end, and a mediate portion, the mediate portions of the side walls including aligned holes, the first end of each said side wall including an engaging notch defined therein;

a rotational first retaining means rotatably mounted to the main body and including a first shaft half, a second shaft half, and two side discs rotatably received in the aligned holes of the main body, respectively, the side discs being coupled to two sides of each of the first shaft half and the second shaft half to rotate therewith and to define a slit between the first shaft half and the second shaft half through which a free end of a strap is extended; and a buckle having a first end connected to the rotational first retaining means to pivot therewith and a second operative end, the second operative end of the buckle further including a second retaining means thereon for releasably engaging with the engaging notches of the main body.

The first shaft half has a first stub extended axially from each of the two sides thereof, the second shaft half has a second stub extended axially from each of the two sides thereof, and each side disc includes two openings through which the first stub and the second stub extend. Each of the first stubs and the second stubs includes a pinhole through which a pin extends.

In accordance with a third aspect of the invention, a buckle device comprises:

a main body including two side walls, each said side wall including a first end, a second end, and a mediate portion, the mediate portions of the side walls including aligned holes, the first end of each said side wall including an engaging notch defined therein;

a rotational first retaining means rotatably mounted to the main body and including a first shaft half having a first stub extended axially from each of two sides thereof, a second shaft half having a second stub extended axially from each of two sides thereof, and two side discs rotatably received in the aligned holes of the main body, respectively, each said side disc including two openings through which the first stub and the second stub extend to securely couple the side discs to the first shaft half and the second shaft half to rotate therewith and to define a slit between the first shaft half and the second shaft half through which a free end of a strap is extended; and a buckle including two side walls each having a first end and a second end, said first end of each said side wall of the buckle including a slot through which an associated said first stub and an associated said second stub extend to couple the buckle to the rotational first retaining means to pivot therewith, the side walls of the buckle further including a second retaining means provided on the second ends thereof for releasably engaging with the engaging notches of the main body.

The free end of the strap wraps around the first shaft half and the second shaft half and extends through the slit between the first shaft half and the second shaft half when the second retaining means on the buckle engages with the engaging notches of the main body.

In a preferred embodiment of the invention, the second retaining means includes a retaining member, an engaging plate secured to the retaining member and having two lateral ends for releasably engaging with the engaging notches of the main body, and an elastic member mounted between the retaining member and the engaging plate for biasing and thus retaining the lateral ends of the engaging plate in the engaging notches of the main body.

DETAILED DESCRIPTION OF THE PREFERRED EMBODIMENT

Figure 1:
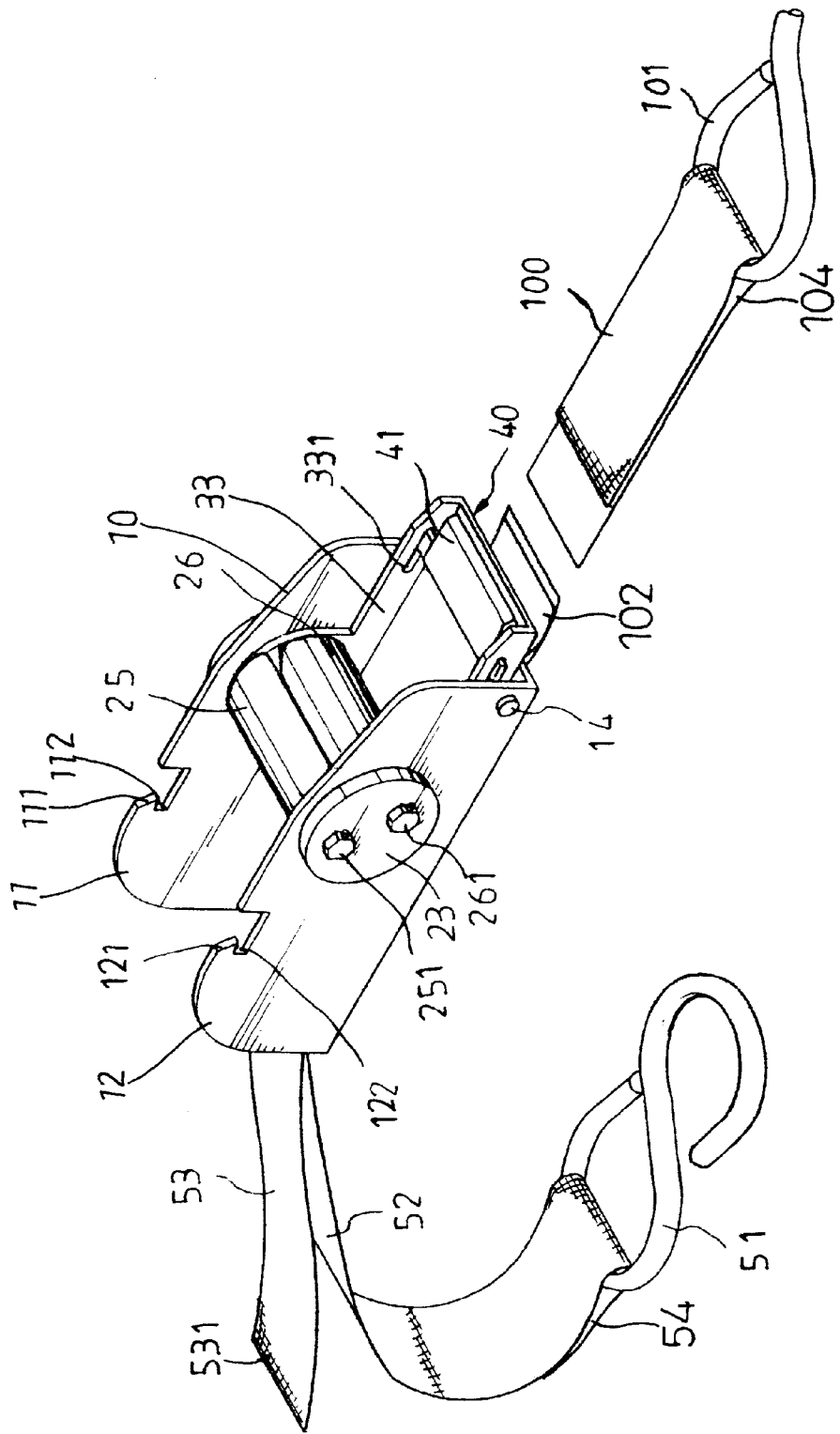
FIG. 1 is a perspective view of a buckle device in accordance with the present invention.
Figure 2:
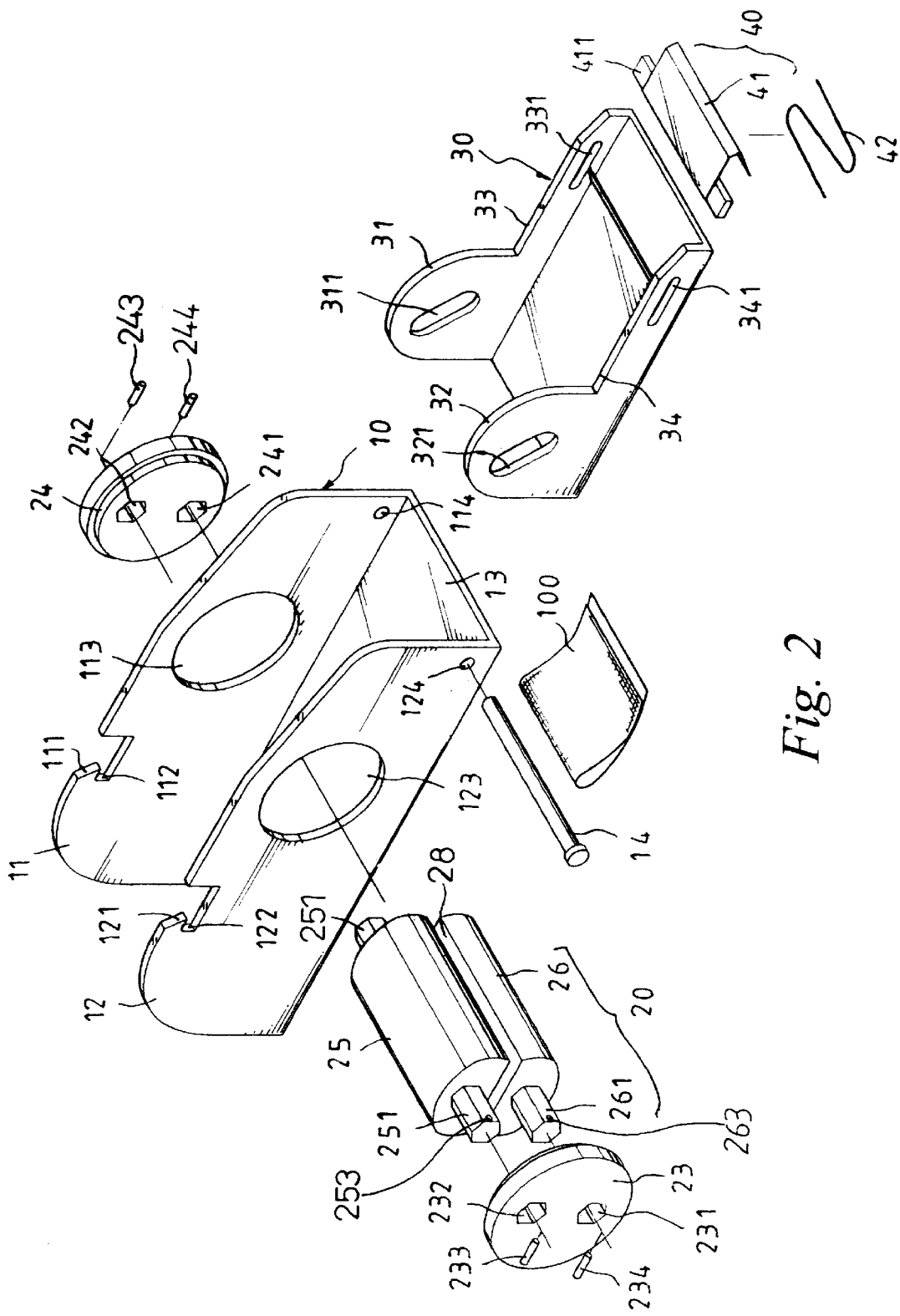
FIG. 2 is an exploded perspective view of the buckle device in accordance with the present invention.

Referring to FIGS. 1 through 5 and initially to FIGS. 1 and 2, a buckle device in accordance with the present invention generally includes a substantially U-shaped main body 10 having a bottom wall 13 and two side walls 11 and 12. Aligned holes 113 and 123 are defined in mediate portions of the side walls 11 and 12. Aligned engaging notches 112 and 122 are defined in first ends of the side walls 11 and 12, each engaging notch 112, 122 having a hook 111, 121 formed on a wall thereof. Aligned holes 114 and 124 are defined in second ends of the side walls 11 and 12 through which a pin 14 extends.

A rotational retaining means 20 is rotatably extended through the aligned holes 113 and 123 of the side walls 11 and 12. The rotational retaining means 20 includes a first shaft half 25 and a second shaft half 26. Each shaft half 25, 26 includes a polygonal stub 251, 261 extended from each of two ends thereof. The rotational retaining means 20 further includes two side discs 23 and 24 each having two polygonal holes 231, 232; 241, 242. In assembly, polygonal stubs 251 and 261 on the first sides of the shaft halves 25 and 26 are inserted through polygonal holes 231 and 232 of side disc 23 and polygonal stubs 251, 261 on second sides of the shaft halves 25 and 26 are inserted through polygonal holes 241 and 242 of side disc 24, and pins 233, 234, 243, 244 are inserted through pinholes 253 and 263 on the polygonal stubs 251, 261 to prevent disengagement of the discs 23 and 24. It is appreciated that an axial slit 28 is defined between the shaft halves 25 and 26, which will be described later.

A buckle 30 includes two side walls 33 and 34 that have aligned ears 31 and 32 formed on first ends thereof and aligned slots 331 and 341 defined in second ends thereof. The ears 31 and 32 have aligned slots 311 and 321 through which associated polygonal stubs 251, 261 of the shaft halves 25 and 26 extend such that the buckle 30 is secured to the rotational retaining means 20 to rotate therewith. A second retainer means 40 includes a retaining member 41, an engaging plate 411 secured to an end of the retaining member 41, and an elastic member 42 mounted in the retaining member 41. The retaining member 41 and the engaging plate 411 may be secured together by riveting or other suitable means.

Figure 3:
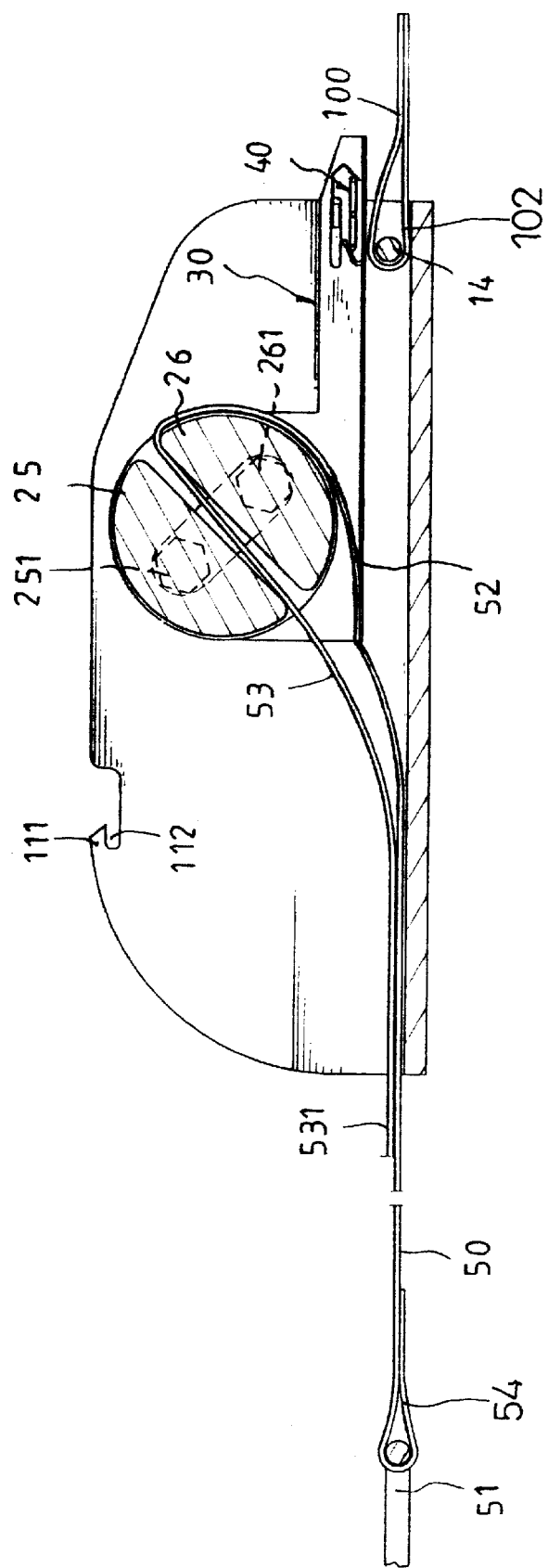
FIG. 3 is a sectional view of the buckle device in accordance with the present invention, wherein the buckle of the buckle device is in a released status.

In assembly, referring to FIGS. 1 through 3, two lateral ends of the engaging plate 411 are extended through the slots 331 and 341 of the buckle 30, respectively, and the elastic member 42 is then mounted into the retaining member 41, wherein an end of the elastic member 42 is attached to the engaging plate 411 and the other end of the elastic member 42 is attached to a side of the retaining member 41. The stubs 251 and 261 of the shaft halves 25 and 26 are extended through the slots 311 and 321 of the buckle 30 that is placed to the mediate portion of the main body 10. The discs 23 and 24 are then assembled to the shaft halves 25 and 26 in a manner described above such that the discs 23 and 24 are rotatably received in the holes 113 and 123 of the main body 10, respectively.

A first strap 100 includes a first end 102 wound around the pin 14 and a second end 104 to which a hook member 101 is attached so as to be hooked to, e.g., a cargo truck frame, which is conventional and therefore not described in detail. A second strap 50 includes a first end 54 to which a hook member 51 is attached so as to be hooked to, e.g., the cargo truck frame, which is conventional and therefore not described in detail. A free second end 531 of the strap 50, is extended into the main body 10 and wound through the axial slit 28 in a manner shown in FIG. 3 and then extended out of the main body 10.

Figure 4:
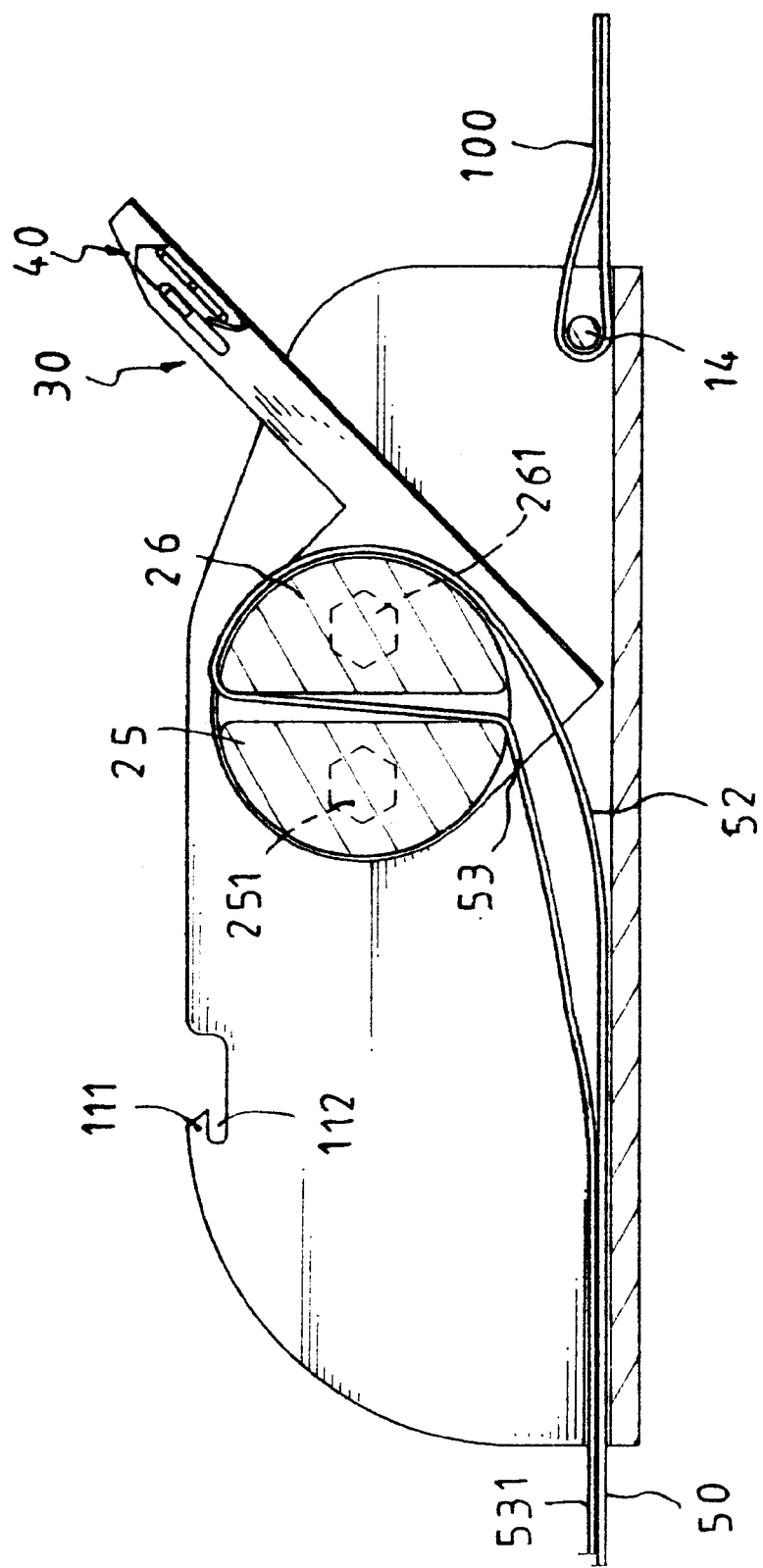
FIG. 4 is a sectional view similar to FIG. 3, wherein the buckle of the buckle device is pivoted.
Figure 5:
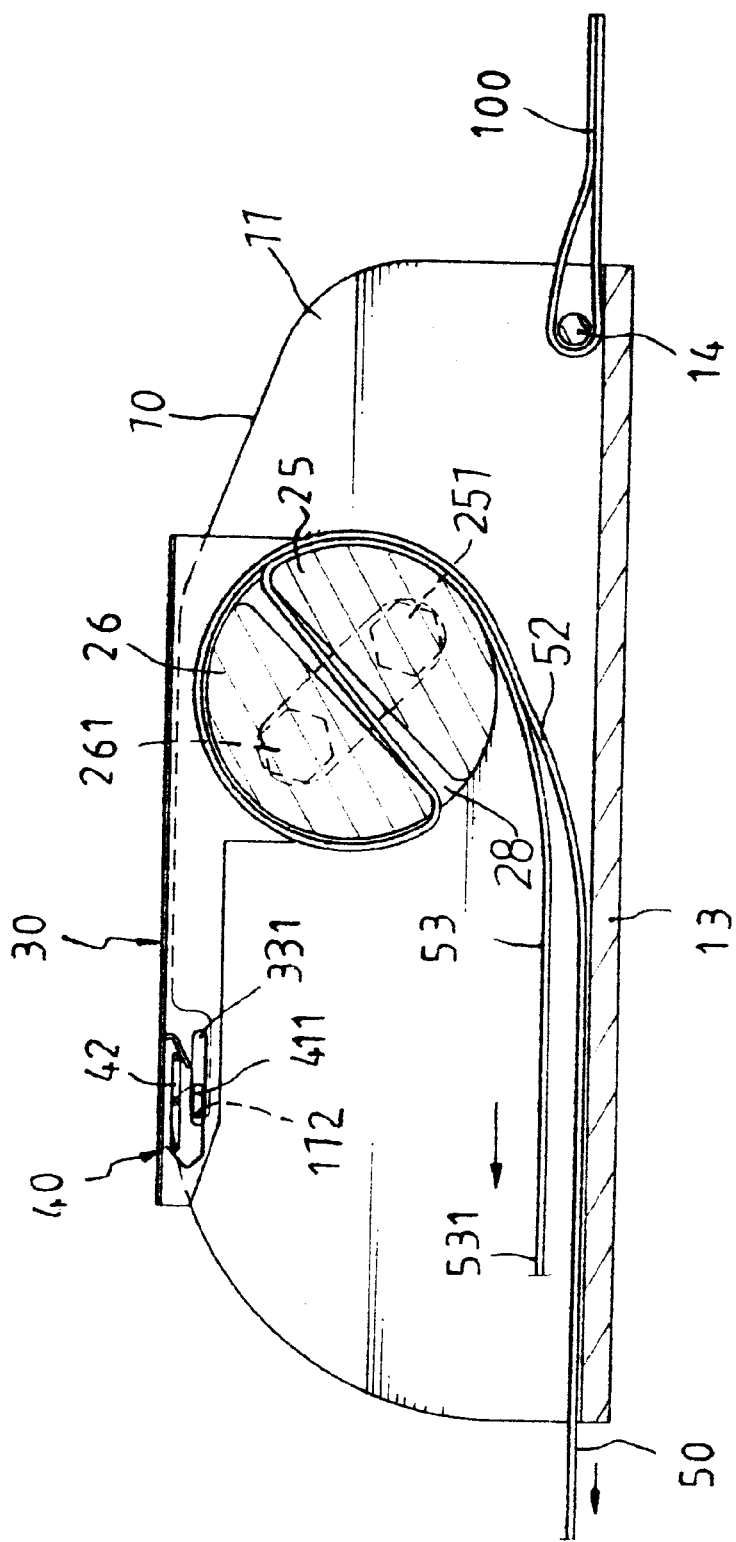
FIG. 5 is a sectional view similar to FIG. 3, wherein the buckle of the buckle device is in a retained position.
Figure 6:
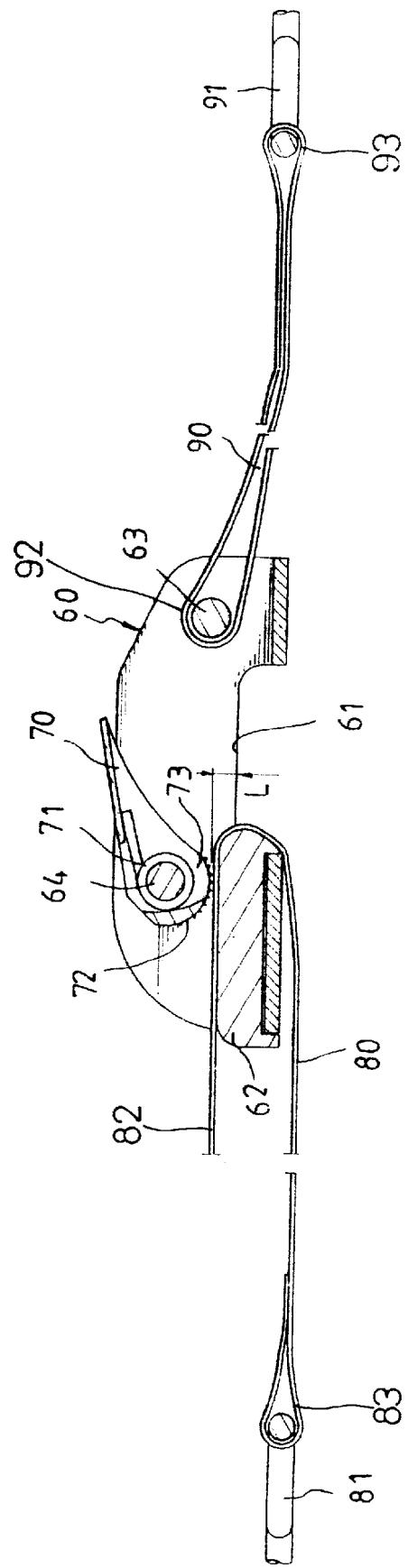
FIG. 6 is a sectional view of a conventional buckle device.

In use, the hook members 51 and 101 (FIG. 1) are hooked to the cargo truck frame (not shown), and the free end 531 of the strap 50 is in a status shown in FIG. 3. Then, the user may pivot the buckle 30 to a status shown in FIG. 5. FIG. 4 shows a transition status of the buckle device. As can be seen from FIG. 5, the rotational retaining means 20 rotates together with the buckle 30 such that the free end 531 of the strap 50 is further wrapped around the rotational retaining means 20. In addition, the lateral ends of the engaging plate 411 on the buckle member 30 are engaged with and thus retained in the engaging notches 112 and 122 by the hooks 111 and 121, respectively. The elastic member 42 assures the retaining effect. Referring to FIG. 5, it is appreciated that the free end 531 of the strap 50 includes a fixed section 52 and a movable section 53 in this status such that the user may pull the free end 531 of the strap 50 away from the main body 10 to adjust the strap 50 until a required tightness is reached. This is because the friction between the movable section 53 of the strap 50 (usually made of nylon) and the rotational shaft halves 25 and 26 (usually made of metal) is small. Nevertheless, displacement of the strap 50 by pulling the lower section (i.e., the fixed section 52) is impossible since friction between the fixed section 52 and the movable section 53 is relatively large owing to the fact that the strap 50 is usually made of nylon.

According to the above description, it is appreciated that the buckle device allows the worker to operate the buckle device using one hand, and the operation is easy. In addition, the buckle device is securely retained in its retained position such that the risk of scattering of goods as a result of loosening of the strap 50 (especially in the fixed section 52) is avoided. Accordingly, injury to people and damage to goods is avoided. Furthermore, the strap 50 has a longer life as it will not be damaged by teeth of conventional buckle devices.

Although the invention has been explained in relation to its preferred embodiment, it is to be understood that many other possible modifications and variations can be made without departing from the spirit and scope of the invention as hereinafter claimed.

What is claimed is:

1. A buckle device comprising, in combination:

a main body having an engaging member and two aligned holes;

a rotational first retaining means including a slit through which a free end of a strap is extended and including two side discs rotatably received in the aligned holes of the main body, with the rotational first retaining means being rotatably mounted to the main body; and a buckle having a first end connected to the rotational first retaining means to pivot therewith and a second operative end, the second operative end of the buckle further including a second retaining means thereon for releasably engaging with the engaging member of the main body.

2. The buckle device as claimed in claim 1, wherein the engaging member of the main body is an engaging notch in which a wall defining the engaging notch has a hook thereon, and wherein the retaining member on the buckle includes a retaining member with an engaging plate releasably engaged with the engaging notch and an elastic member for biasing the engaging plate to engage with the engaging notch.

3. A buckle device comprising:

a main body including two side walls, each said side wall including a first end, a second end, and a mediate portion, the mediate portions of the side walls including aligned holes, the first end of each said side wall including an engaging notch defined therein;

a rotational first retaining means rotatably mounted to the main body and including a first shaft half, a second shaft half, and two side discs rotatably received in the aligned holes of the main body, respectively, the side discs being coupled to two sides of each of the first shaft half and the second shaft half to rotate therewith and to define a slit between the first shaft half and the second shaft half through which a free end of a strap is extended; and a buckle having a first end connected to the rotational first retaining means to pivot therewith and a second operative end, the second operative end of the buckle further including a second retaining means thereon for releasably engaging with the engaging notches of the main body.

4. The buckle device as claimed in claim 3, wherein the first shaft half has a first stub extended axially from each of the two sides thereof, the second shaft half has a second stub extended axially from each of the two sides thereof, and each said side disc includes two openings through which the first stub and the second stub extend.

5. The buckle device as claimed in claim 4, wherein each of said first stubs and said second stubs includes a pinhole through which a pin extends.

6. A buckle device comprising:

a main body including two side walls, each said side wall including a first end, a second end, and a mediate portion, the mediate portions of the side walls including aligned holes, the first end of each said side wall including an engaging notch defined therein;

a rotational first retaining means rotatably mounted to the main body and including a first shaft half having a first stub extended axially from each of two sides thereof, a second shaft half having a second stub extended axially from each of two sides thereof, and two side discs rotatably received in the aligned holes of the main body, respectively, each said side disc including two openings through which the first stub and the second stub extend to securely couple the side discs to the first shaft half and the second shaft half to rotate therewith and to define a slit between the first shaft half and the second shaft half through which a free end of a strap is extended; and a buckle including two side walls each having a first end and a second end, said first end of each said side wall of the buckle including a slot through which an associated said first stub and an associated said second stub extend to couple the buckle to the rotational first retaining means to pivot therewith, the side walls of the buckle further including a second retaining means provided on the second end thereof for releasably engaging with the engaging notches of the main body.

7. The buckle device as claimed in claim 6, wherein each of said first stubs and said second stubs includes a pinhole through which a pin extends.

8. The buckle device as claimed in claim 6, wherein the second retaining means includes a retaining member, an engaging plate secured to the retaining member and having two lateral ends for releasably engaging with the engaging notches of the main body, and an elastic member mounted between the retaining member and the engaging plate for biasing and thus retaining the lateral ends of the engaging plate in the engaging notches of the main body.

9. The buckle device as claimed in claim 6, wherein the free end of the strap wraps around the first shaft half and the second shaft half and extends through the slit between the first shaft half and the second shaft half when the second retaining means on the buckle engages with the engaging notches of the main body.

* * * * *